United States Patent
Burghard et al.

(10) Patent No.: US 9,372,783 B2
(45) Date of Patent: Jun. 21, 2016

(54) RECORDING THE CORE DATA OF A COMPUTER PROCESS WHICH PROVIDES TRACE DATA

(71) Applicant: International Business Machines Corporation, Armonk, NY (US)

(72) Inventors: Stephen J. Burghard, Hursley (GB); David J. Harman, Hursley (GB); Neil W. Leedham, Hursley (GB); Andrew Wright, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 14/067,643

(22) Filed: Oct. 30, 2013

(65) Prior Publication Data

US 2014/0122940 A1 May 1, 2014
US 2016/0139975 A9 May 19, 2016

(30) Foreign Application Priority Data

Oct. 31, 2012 (GB) .................... 1219535.0

(51) Int. Cl.
*G06F 11/00* (2006.01)
*G06F 11/36* (2006.01)
*G06F 11/07* (2006.01)
*G06F 11/34* (2006.01)

(52) U.S. Cl.
CPC .......... *G06F 11/366* (2013.01); *G06F 11/0724* (2013.01); *G06F 11/0778* (2013.01); *G06F 11/34* (2013.01)

(58) Field of Classification Search
CPC ................................................ G06F 11/3466
See application file for complete search history.

(56) References Cited

U.S. PATENT DOCUMENTS

| 7,200,588 | B1 | 4/2007 | Srivastava et al. |
| 7,475,387 | B2 | 1/2009 | Chandane |
| 7,870,437 | B2 * | 1/2011 | Swaine et al. ................... 714/45 |
| 8,914,677 | B2 * | 12/2014 | Bohling et al. ................. 714/35 |
| 2005/0273665 | A1 | 12/2005 | Menadue |

(Continued)

FOREIGN PATENT DOCUMENTS

| JP | H0432936 A | 2/1992 |
| JP | H0764825 A | 3/1995 |
| JP | 2004185345 A | 7/2004 |

OTHER PUBLICATIONS

Matni et al., "Operating System Level Trace Analysis for Automated Problem Identification," The Open Cybernetics & Systemics Journal, vol. 5, Mar. 2011, pp. 45-51.

(Continued)

*Primary Examiner* — Christopher McCarthy
(74) *Attorney, Agent, or Firm* — Yee & Associates, P.C.; Joseph Petrokaitis

(57) ABSTRACT

A method, apparatus and computer program for recording the core data of a computer process, the computer process comprising trace points and core data is provided for each such trace point. A first set of core data comprising an image of a memory for the computer process is stored in response to a first set of trace data being produced for the computer process for a first trace point. A second set of core data is stored in response to a second set of trace data being produced for the computer process for a second trace, where the second set of core data comprises a record of any change in current memory contents for the computer process with respect to the first set of core data.

21 Claims, 5 Drawing Sheets

(56) References Cited

U.S. PATENT DOCUMENTS

| | | | |
|---|---|---|---|
| 2007/0011492 A1* | 1/2007 | Swaine | 714/35 |
| 2009/0106741 A1 | 4/2009 | Dageville et al. | |
| 2009/0125756 A1* | 5/2009 | Swaine et al. | 714/45 |
| 2009/0216967 A1 | 8/2009 | Sugawara | |
| 2012/0017123 A1* | 1/2012 | Masser et al. | 714/45 |
| 2012/0246518 A1 | 9/2012 | Francis et al. | |
| 2014/0006874 A1* | 1/2014 | Bohling et al. | 714/45 |
| 2014/0173356 A1* | 6/2014 | Burghard et al. | 714/45 |
| 2014/0173358 A1* | 6/2014 | Burghard et al. | 714/45 |

OTHER PUBLICATIONS

Yuan et al., "Automated Known Problem Diagnosis with Event Traces," Proceedings of the 1st ACM SIGOPS/EuroSys European Conference on Computer Systems (EuroSys 2006), Apr. 2006, pp. 375-388.

UK Intellectual Property Office Search Report, dated Mar. 14, 2013, regarding Application No. GB1219535.0, 3 pages.

* cited by examiner

RECORDING THE CORE DATA OF A COMPUTER PROCESS WHICH PROVIDES TRACE DATA

CROSS REFERENCE TO RELATED APPLICATIONS

This Application claims the benefit of priority to United Kingdom Patent Application Serial No. 1219535.0, filed on Oct. 31, 2012, the contents of which are hereby incorporated by reference.

FIELD OF INVENTION

The present invention relates to recording the core data of a computer process wherein the computer process is arranged to provide trace data.

BACKGROUND

Computing systems require memory in order to function. This computer memory is referenced by address and the full range of memory available to the system is known as the address space. When a problem with a computer system is being investigated, a copy or image of this address space, that is, the memory addresses and address data contents, can be stored for later inspection. Such data is commonly referred to as core or dump data and stored in a core or dump file.

If the program under investigation has been written to include trace entries, these can be enabled so that diagnostic information in the form of trace data is written out or cut to a trace file during the execution of the program. The combination of the dump or core data and the trace data enables engineers analyzing the performance of the relevant program to inspect the contents of memory when the dump file was taken and compare this with the trace data produced during the processing of the program in an attempt to identify the cause of a problem.

One problem with this arrangement is that tracing has limitations as only those areas of the address space that the developer decided to trace when the code was written are available for subsequent analysis. Therefore, in many cases the data required to resolve a given problem may not be present in the trace data. For example if a parameter list is traced out containing a pointer, it is not possible to view the storage addressed by the pointer unless it also happened to be specifically traced out. Another problem is that the core file may not reflect the content of memory when a problem actually occurred. This is because the contents of memory at the time the problem occurred may have been subsequently modified by processing that occurred before a dump file was subsequently created.

BRIEF SUMMARY OF THE INVENTION

An embodiment of the invention provides a method for recording the core data of a computer process wherein the computer process is arranged to provide trace data, the method comprising the steps of: storing a first set of core data comprising an image of the memory for a computer process in response to a first set of trace data being produced for the computer process for a first trace point; and storing a second set of core data in response to a second set of trace data being produced for the computer process for a second trace, wherein the second set of core data comprises a record of any change in the current memory contents for the computer process with respect to the first set of core data.

Embodiments of the invention remove the need for a full core file to be saved at the point at which a crash or other problem occurs with the process being monitored, thus speeding up the computer processing and reducing storage requirements. Since such core files can be very large and thus time consuming to produce, embodiments of the invention therefore reduce the processing time required to recover from a crash.

Embodiments of the invention enable the state of memory to be more quickly determined at any given trace point, providing the engineer with both trace data and the contemporaneous memory image, thus improving the information available for identifying the cause of the relevant fault. Therefore, trace data references to memory locations, such as pointers, may be dereferenced so as to provide further insight into the cause of a problem being diagnosed.

Embodiments of the invention provide a storage and processing-efficient method for recording core data at each trace point that avoids the need to perform repeated memory dumps.

The method may comprise the step of: storing a third set of core data in response to a third set of trace data being produced for the computer process for a third trace point, wherein the third set of core data comprises a record of any change in the current memory contents subsequent to the storing of the second set of core data.

Each set of core data may comprise a record of the relevant elements of the memory that is substantially contemporaneous with the production of the associated set of trace data by the computer process. The image of the memory for the first set of core data may comprise a copy of register data for the computer process and each subsequent set of core data comprises a record of any change in the register contents subsequent to the storing of the respective prior set of core data. The record of a change in memory contents may comprise the relevant memory address and a copy of the new contents for the memory address. In response to the storing of a set of core data, the memory may be monitored for any change and in response to each detected change, the relevant change is recorded for inclusion in the subsequent set of core data. Each set of core data may be stored in association with the respective set of trace data. Each set of trace data may comprise the respective set of core data. An image of the memory contemporaneous with production of the second set of trace data may be provided by applying each change in the memory contents recorded in the second set of core data to the first set of core data.

The method may comprise the steps of: identifying the set of core data associated with a selected set of trace data; identifying the further sets of core data associated with each set of trace data produced prior to the selected set of trace data; and providing an image of the memory contemporaneous with production of the selected set of trace data by applying each change in the memory contents recorded in each identified further set of core data, in the order in which each change occurred, to the identified first set of core data.

Another embodiment provides apparatus for recording the core data of a computer process wherein the computer process is arranged to provide trace data, the apparatus being operable to: store a first set of core data comprising an image of the memory for a computer process in response to a first set of trace data being produced for the computer process for a first trace point; and store a second set of core data in response to a second set of trace data being produced for the computer process for a second trace, wherein the second set of core data comprises a record of any change in the current memory contents for the computer process with respect to the first set of core data.

A further embodiment provides a computer program stored on a computer readable medium and loadable into the internal memory of a digital computer, comprising software code portions, when said program is run on a computer, for performing a method for recording the core data of a computer process wherein the computer process is arranged to provide trace data, the method comprising the steps of: storing a first set of core data comprising an image of the memory for a computer process in response to a first set of trace data being produced for the computer process for a first trace point; and storing a second set of core data in response to a second set of trace data being produced for the computer process for a second trace, wherein the second set of core data comprises a record of any change in the current memory contents for the computer process with respect to the first set of core data.

Another embodiment provides a method or system substantially as described with reference to the figures.

BRIEF DESCRIPTION OF THE DRAWINGS

Preferred embodiments of the invention will now be described, by way of example only, with reference to the following drawings in which.

DETAILED DESCRIPTION OF THE EMBODIMENTS

Figure 1:
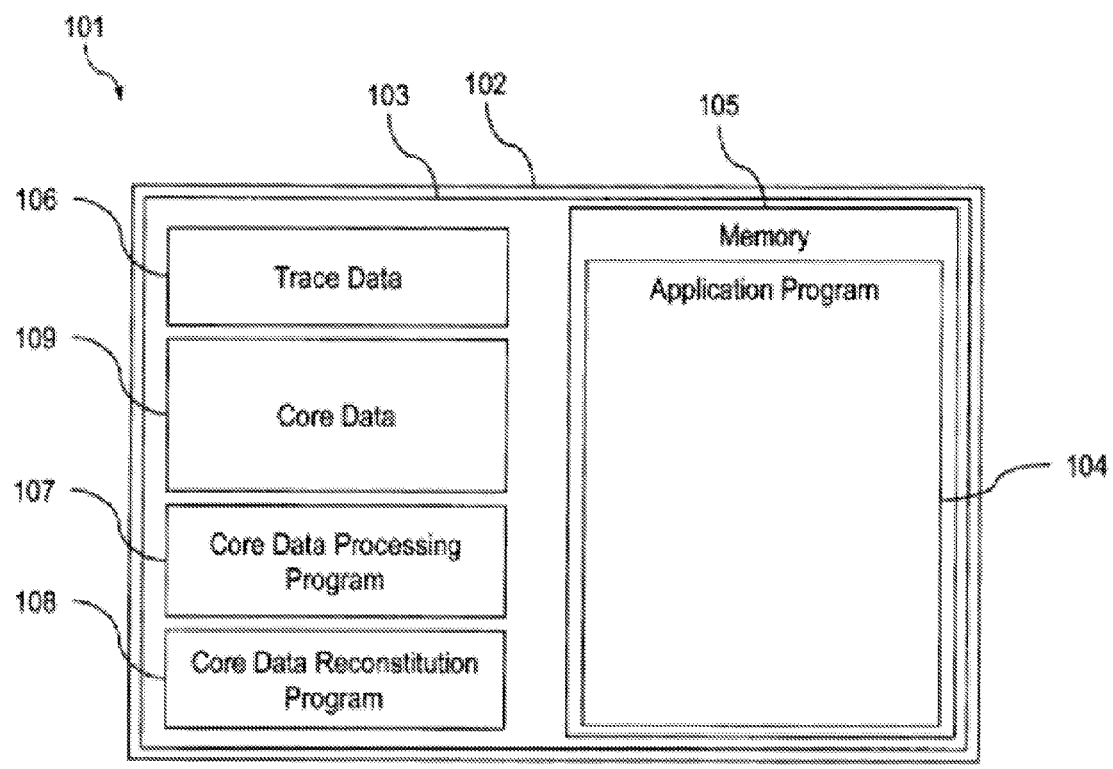
FIG. 1 is a schematic representation of a computer system running a computer process producing trace data, a core data processing program and a core data reconstitution program.

With reference to FIG. 1, a computer system 101 comprises a computer 102 running an operating system 103 providing a processing platform for the processing of one or more processes in the form of application programs. In the present embodiment, the computer is running an application program 104 in memory 105. The application program 104 is provided with trace code (not shown), which is arranged to output trace data 106 at points in the processing of the application program 104 referred to as trace points. The operating system 103 comprises a core data processing program 107 and a core data reconstitution program 108. The core data processing program 107 is arranged to store core data 109 in response to the production of each element of the trace data 106 by the trace points processed during the processing of the application program 104 and will be described with reference to FIGS. 2 and 4 below. The core data reconstitution program 108 is arranged to reconstitute one or more images of the memory 105 from the core data 109, each such image being substantially contemporaneous with a respective selected element of the trace data 106 and will be described with reference to FIGS. 3 and 5 below.

Figure 2:
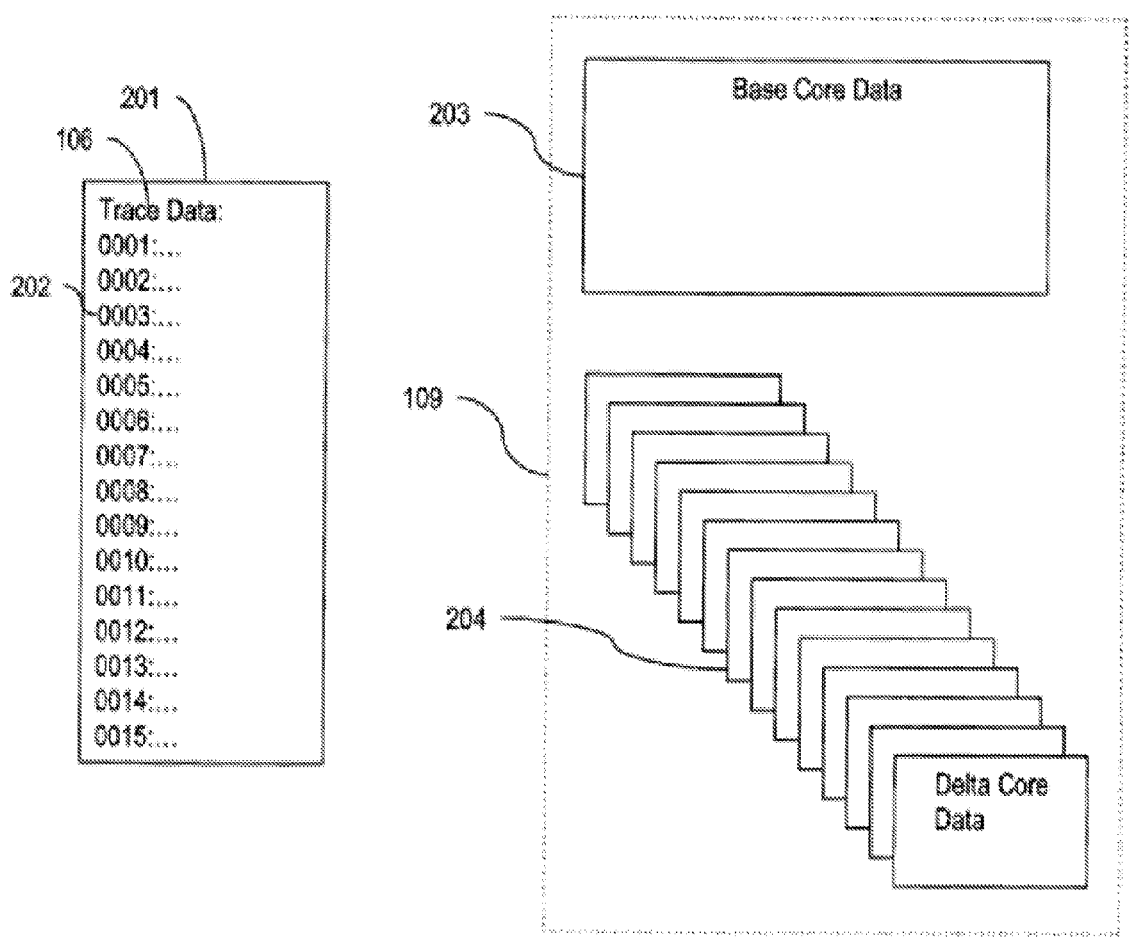
FIG. 2 is a schematic representation of a set of trace data and a set of core data produced by the core data processing program from the processing of the computer process of FIG. 1.

With reference to FIG. 2, the trace data 106 is stored in a file 201 and comprises a sequential set of trace data elements 202 produced in response to a corresponding trace point. The trace data elements 202 are numbered sequentially in order of their creation. The core data processing program 107 is arranged to monitor the operation of the application program 104 for the outputting of trace data 202 to the trace file 201. In response to the entry of the first trace data element 202 in the trace file 201 resulting from the processing of the first trace point by the application program 104, the core data processing program 107 is arranged to save a substantially contemporaneous image of the memory 105 as a first set of core data in the form of base core data 203.

In response to each subsequent entry of trace data 202 in the trace file 201 resulting from the processing of each further trace point by the application program 104, the core data processing program 107 is arranged to save a respective second set of core data in the form of delta core data 204. The first set of delta core data 204 is produced in response to the processing of the second trace point in the application program 104. This first set of delta core data 204 comprises a record of each address and corresponding data contents in memory 105 that has been modified since the base core data 203 was recorded. In other words, the delta core data 204 represents the difference between the contents of the memory 105 at the first trace point and its contents at the second trace point. The third and each subsequent set of delta core data 204 each comprise a record of each address and corresponding data contents in memory 105 that has been modified since the immediately prior delta core data 204 was recorded.

In the present embodiment the delta core data is recorded incrementally, that is, each time a change is made in the memory, the change is logged as pending delta core data (not shown) until new trace data 106 is produced at which point the pending delta core data is saved in association with the new trace data element 202 as a new set of delta core data 204. The recording of a new set of pending delta core data then proceeds until the next trace point is processed by the application program 104.

Figure 3:
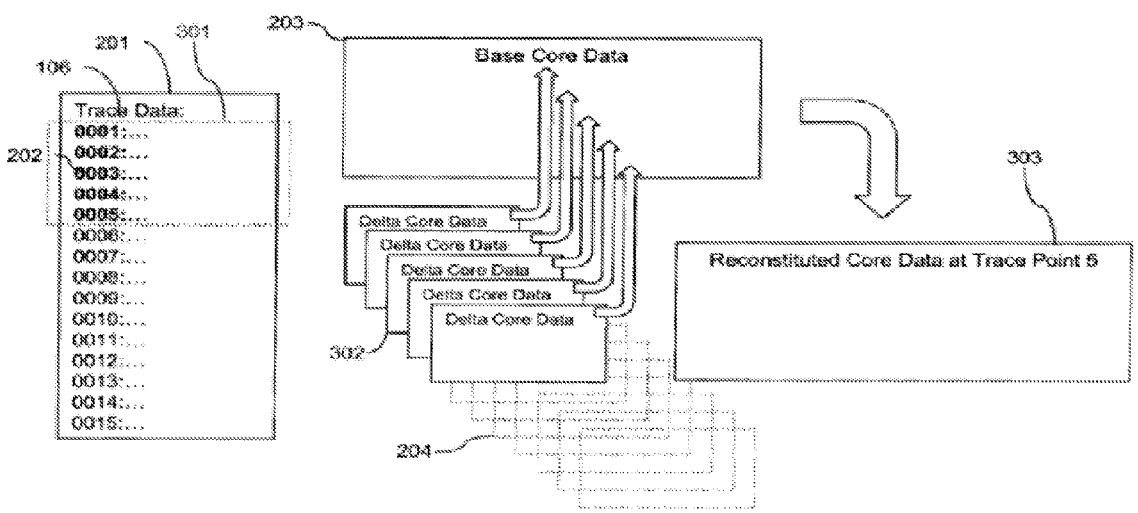
FIG. 3 is a schematic illustration of the reconstitution of a set of core data representing the contents of the memory for the computer process at a selected trace point.

With reference to FIG. 3, the core data reconstitution program 108 is arranged in response to user selection of a given element of trace data 202 to identify all preceding trace data elements 202 in the trace file 201 and each associated set of delta core data 302. Each such set of delta core data 302, in order of creation, that is, oldest first, is then applied to the base core data 203. Once all of the identified sets of delta core data 302 have been applied to the base core data 203, a reconstituted set of core data 303 is formed that comprises the state of the memory 105 at substantially the same time in the historical processing of the application program 104 as the user selected trace data element 202 was produced. In the same manner, the core data reconstitution program 108 is arranged to provide the relevant reconstituted core files 303 for each of a range of two or more selected trace data elements 202.

Figure 4:
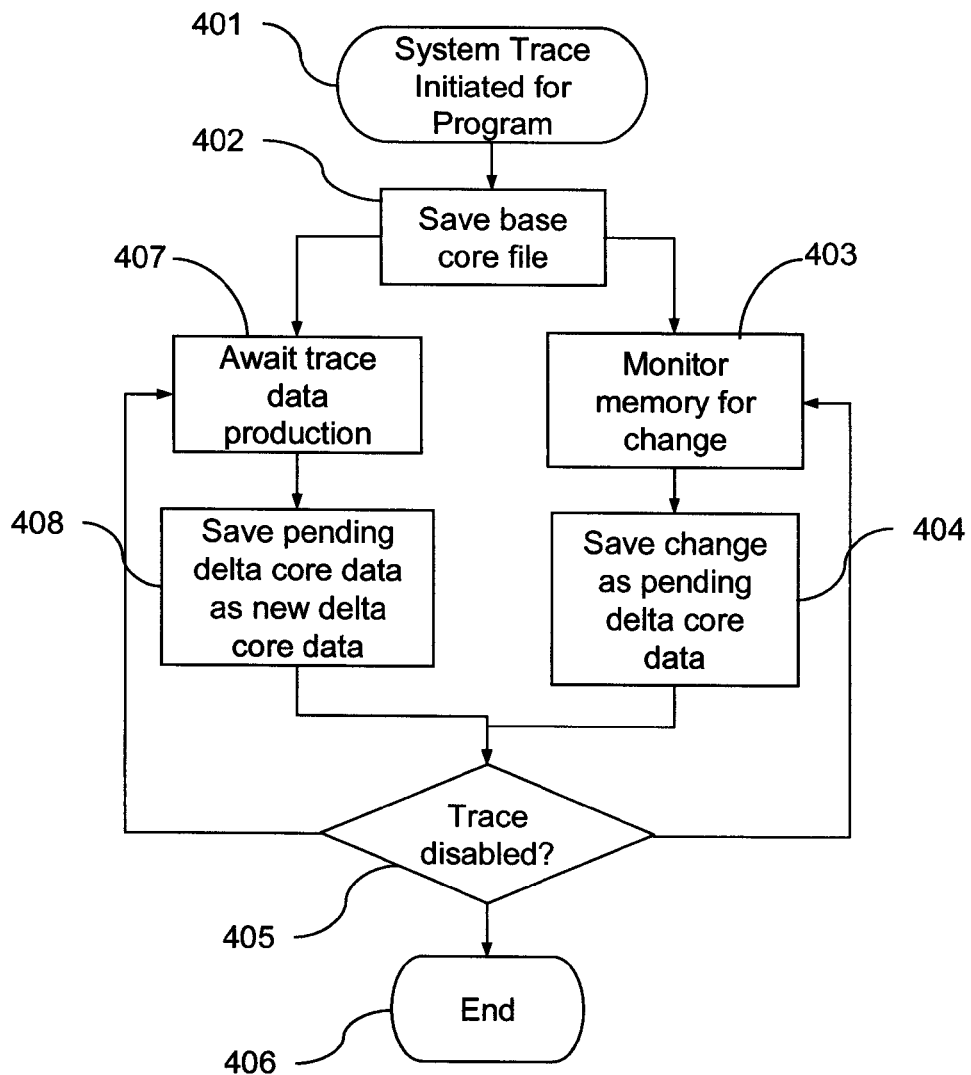
FIG. 4 is a flow chart illustrating the processing performed by the core data processing program of FIG. 1 when producing the data of FIG. 2.

The processing performed by the core data processing program 107 will now be described with reference to the flow chart of FIG. 4. Processing is initiated at step 401 in response to the initiation of tracing for the application program 104, and processing moves to step 402. At step 402 an image of the memory 105 used by the application program 104 is saved as the base core data 203 and processing then splits into two threads. One thread moves to step 403 where the memory 105 is monitored for any change or modification by the application program 104, and when such a change is identified processing moves to step 404. At step 404 the change in memory is recorded as pending delta core data and processing then moves to step 405. At step 405, if tracing of the application remains enabled then processing returns to step 403 and proceeds as described above. If at step 405 tracing has been disabled, then processing moves to step 406 and ends. Another thread moves from step 402 to step 407 where the production of further trace data 106 by the application program 104 is monitored and when produced processing moves to step 408. At step 408 the pending delta core data is saved as a new set of delta core data 204 and processing then moves to step 405 and proceeds as described above.

Figure 5:
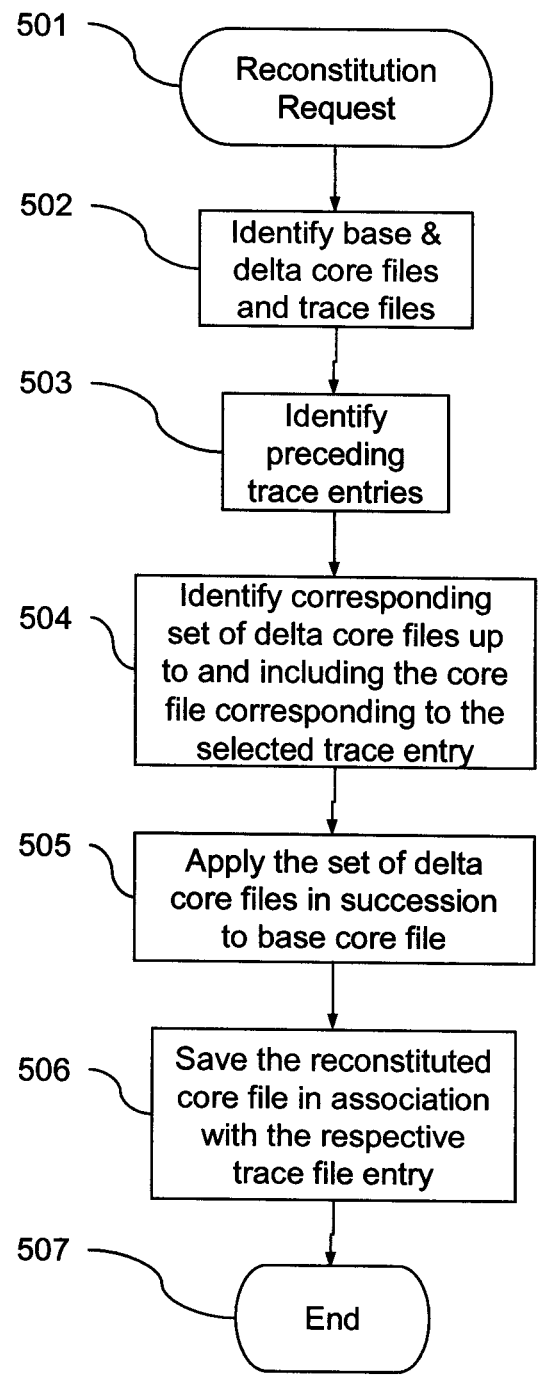
FIG. 5 is a flow chart illustrating the processing performed by the core data reconstitution program of FIG. 1 when producing the set of core data representing the contents of the memory of FIG. 3.

The processing performed by the core data processing program 108 will now be described with reference to the flow chart of FIG. 5. Processing is initiated at step 501 in response to an input request identifying a given trace data element 202, and processing moves to step 502. At step 502 the relevant sets of base and delta core data 203, 204 are identified and processing moves to step 503. At step 503 all preceding trace data elements 202 to the selected trace data element 202 are identified, and processing moves to step 504. At step 504 each set of delta core data 302 associated with the selected and preceding trace data elements 202 are identified, and processing moves to step 505. At step 505 each identified set of core data 302 is applied to the base core data 203 in order of creation, oldest first, and processing moves to step 506. At step 506 the modified base core data set 203 is saved as the reconstituted core data 303 for the selected trace data element 202, and processing moves to step 507 and ends.

In another embodiment, the core data processing program is arranged to record relevant register data in the base and delta core data sets. The core data reconstitution program is arranged to reconstitute the register data accordingly.

In a further embodiment, the core data processing program and the core data reconstitution program are provided as a single program. In another embodiment the functionality of the core data processing program and the core data reconstitution program is provided as part of the operating system.

In another embodiment, the reconstituted core data files for all trace files entries are produced automatically.

As will be understood by those skilled in the art, the trace or core data sets may be stored in any suitable type of one or more data structures. The data may be stored in respective files or stored in a single data structure or one or more distributed data structures.

Embodiments of the invention remove the need for a full core file to be saved at the point at which a crash or other problem occurs with the process being monitored. Since such core files can be very large and thus time consuming to produce, embodiments of the invention therefore reduce the time to recover and debug from a crash.

Embodiments of the invention enable the state of memory to be determined at any given trace point, providing the engineer with both trace data and the contemporaneous memory image, thus improving the information available for identifying the cause of the relevant fault. Therefore, trace data references to memory locations, such as pointers, may be dereferenced so as to provide further insight into the cause of a problem being diagnosed.

Embodiments of the invention provide an efficient method for recording core data at each trace point that avoids the need to perform repeated memory dumps.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of". It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. A method for recording core data of a computer process, wherein the computer process provides trace data, the method comprising:
responsive to an entry of first trace data in a trace file resulting from processing of a first trace point by a core data processing program, storing a first set of core data comprising an image of a memory for the computer process, as base core data;
splitting the core data processing program into two threads, wherein the image of the memory is monitored for a change in the image of the memory by a first thread;
responsive to detecting the change in the image of the memory, recording the change in the image of the memory by the first thread of the core data processing program as first pending delta core data comprising a record of each address and corresponding data contents in the image of the memory that has been modified since the base core data was stored;
monitoring for production of further trace data by a second thread; and
responsive to production of the further trace data produced for the computer process for a second trace point as an entry of second trace data in the trace file, storing the first pending delta core data as a first set of delta core data, wherein the first set of delta core data comprises a record of any change in a current image of the memory for the computer process with respect to the base core data, and wherein the first set of delta core data represents a difference between contents of the image of the memory at the first trace point and the contents of the image of the memory at the second trace point, and wherein the delta core data is recorded incrementally, each time the change is made in the image of the memory, and wherein the change in the image of the memory is logged as pending delta core data until new trace data is produced at which point the pending delta core data is saved in association with the new trace data as a new set of delta core data.

2. The method according to claim 1 further comprising:
storing a second set of delta core data in response to a third set of trace data being produced for the computer process for a third trace point, wherein the second set of delta core data comprises a record of any change in the current image of the memory subsequent to the storing of the first set of delta core data.

3. The method according to claim 1, wherein each set of delta core data comprises a record of relevant elements of the image of the memory that is substantially contemporaneous with the production of an associated set of trace data by the computer process.

4. The method according to claim 1, wherein the image of the memory for the first set of delta core data comprises a copy of register data for the computer process, and wherein each subsequent set of delta core data comprises a record of any change in register contents subsequent to the storing of a respective prior set of delta core data.

5. The method according to claim 1, wherein the record of a change in the image of the memory comprises a relevant memory address and a copy of new contents for the memory address.

6. The method according to claim 1, wherein in response to the storing of a set of delta core data, the image of the memory is monitored for any change and in response to each detected change, a relevant change is recorded for inclusion in a subsequent set of delta core data.

7. The method according claim 1, wherein each set of delta core data is stored in association with the respective set of trace data.

8. The method according to claim 1, wherein each set of trace data comprises the respective set of delta core data.

9. The method according to claim 1, wherein the image of the memory contemporaneous with production of the second set of trace data is provided by applying each change in the image of the memory recorded in the first set of delta core data to the base core data.

10. The method according to claim 1, further comprising:
identifying a set of delta core data associated with a selected set of trace data;
identifying further sets of delta core data associated with each set of trace data produced prior to the selected set of trace data; and
providing the image of the memory contemporaneous with production of the selected set of trace data by applying each change in the image of the memory recorded in each identified further set of delta core data, in an order in which each change occurred, to an identified base core data.

11. An apparatus for recording core data of a computer process, wherein the computer process provides trace data, the apparatus comprising:
a computer, including a memory having computer program instructions of a core data processing program stored therein, wherein the computer executes the computer program instructions to direct the computer to:
store a first set of core data comprising an image of a memory for the computer process in response to entry of a first trace data in a trace file resulting from processing of a first trace point by a core data processing program, as base core data;
split the core data processing program into two threads, wherein the image of the memory is monitored for a change in the image of the memory for the computer process by a first thread;
record the change by the first thread of the core data processing program as first pending delta core data comprising a record of each address and corresponding data contents in the image of the memory for the computer process that has been modified since the base core data was stored in response to detecting the change in the image of the memory for the computer process;
monitor for production of further trace data by a second thread; and
store the first pending delta core data as a first set of delta core data in response to production of the further trace data produced for the computer process for a second trace point as an entry of second trace data in the trace file, wherein the first set of delta core data comprises a record of any change in a current image of the memory for the computer process with respect to the base core data, wherein the first set of delta core data represents a difference between the image of the memory at the first trace point and the image of the memory at the second trace point, and wherein the delta core data is recorded incrementally, each time the change is made in the image of the memory, and wherein the change in the image of the memory is logged as pending delta core data until new trace data is produced at which point the pending delta core data is saved in association with the new trace data as a new set of delta core data.

12. The apparatus according to claim 11, wherein the computer further executes the computer program instructions to:
store a second set of delta core data in response to a third set of trace data being produced for the computer process for a third trace point, wherein the second set of delta core data comprises a record of any change in the current image of the memory, subsequent to the storing of the first set of delta core data.

13. The apparatus according to claim 11, wherein each set of delta core data comprises a record of relevant elements of the image of the memory that is substantially contemporaneous with the production of an associated set of trace data by the computer process.

14. The apparatus according to claim 11, wherein the image of the memory for the first set of delta core data comprises a copy of register data for the computer process, and wherein each subsequent set of delta core data comprises a record of any change in register contents subsequent to the storing of a respective prior set of delta core data.

15. The apparatus according to claim 11, wherein the record of a change in the image of the memory comprises a relevant memory address and a copy of new contents for the memory address.

16. The apparatus according to claim 11, wherein in response to the storing of a set of delta core data, the image of the memory is monitored for any change and in response to each detected change, a relevant change is recorded for inclusion in a subsequent set of delta core data.

17. The apparatus according to claim 11, wherein each set of delta core data is stored in association with the respective set of trace data.

18. The apparatus according to claim 11, wherein each set of trace data comprises the respective set of delta core data.

19. The apparatus according to claim 11, wherein the image of the memory contemporaneous with production of the second set of trace data is provided by applying each change in the image of the memory recorded in the first set of delta core data to the base core data.

20. The apparatus according to claim 11, wherein the computer further executes the computer program instructions to:
identify a set of delta core data associated with a selected set of trace data;
identify further sets of delta core data associated with each set of trace data produced prior to the selected set of trace data; and
provide the image of the memory contemporaneous with production of the selected set of trace data by applying each change in the image of the memory recorded in each identified further set of delta core data, in an order in which each change occurred, to an identified base core data.

21. A computer program product for recording core data of a computer process, wherein the computer process provides trace data, the computer program product comprising a non-transitory computer readable storage device having computer readable program instructions embodied thereon, which when executed by a computer directs the computer to:
store a first set of core data comprising an image of a memory for the computer process, as base core data in response to an entry of a first trace data in a trace file resulting from processing of a first trace point by a core data processing program;
split the core data processing program into two threads, wherein the image of the memory is monitored for a change in the image of the memory by a first thread;
record the change in the image of the memory by the first thread of the core data processing program as first pending delta core data comprising a record of each address and corresponding data contents in the image of the memory that has been modified since the base core data was stored in response to detecting the change in the image of the memory;

monitor for production of further trace data by a second thread; and store the first pending delta core data as a first set of delta core data in response to a second set of trace data in response to production of the further trace data produced for the computer process for a second trace point as an entry of a second trace data in the trace file, wherein the first set of delta core data comprises a record of any change in a current image of the memory for the computer process with respect to the base core data, and wherein the first set of delta core data represents a difference between contents of the image of the memory at the first trace point and the contents of the image of the memory at the second trace point, and wherein the delta core data is recorded incrementally, each time the change is made in the image of the memory, and wherein the change in the image of the memory is logged as pending delta core data until new trace data is produced at which point the pending delta core data is saved in association with the new trace data as a new set of delta core data.

\* \* \* \* \*